No. 658,937. Patented Oct. 2, 1900.
F. BAUER & D. GENRE.
DUMPING WAGON.
(Application filed Apr. 20, 1900.)
(No Model.) 2 Sheets—Sheet 1.
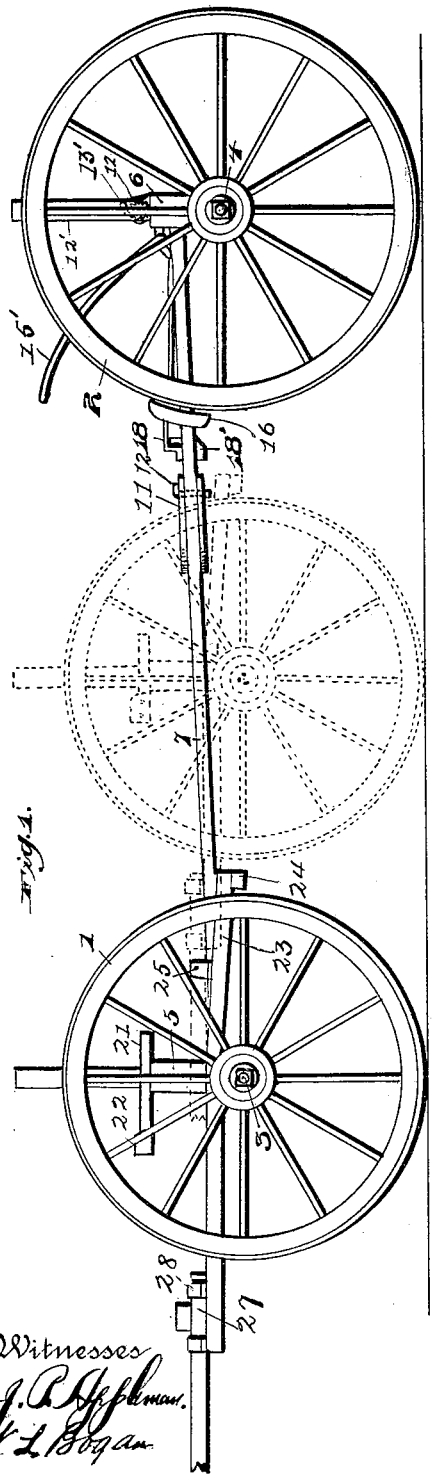
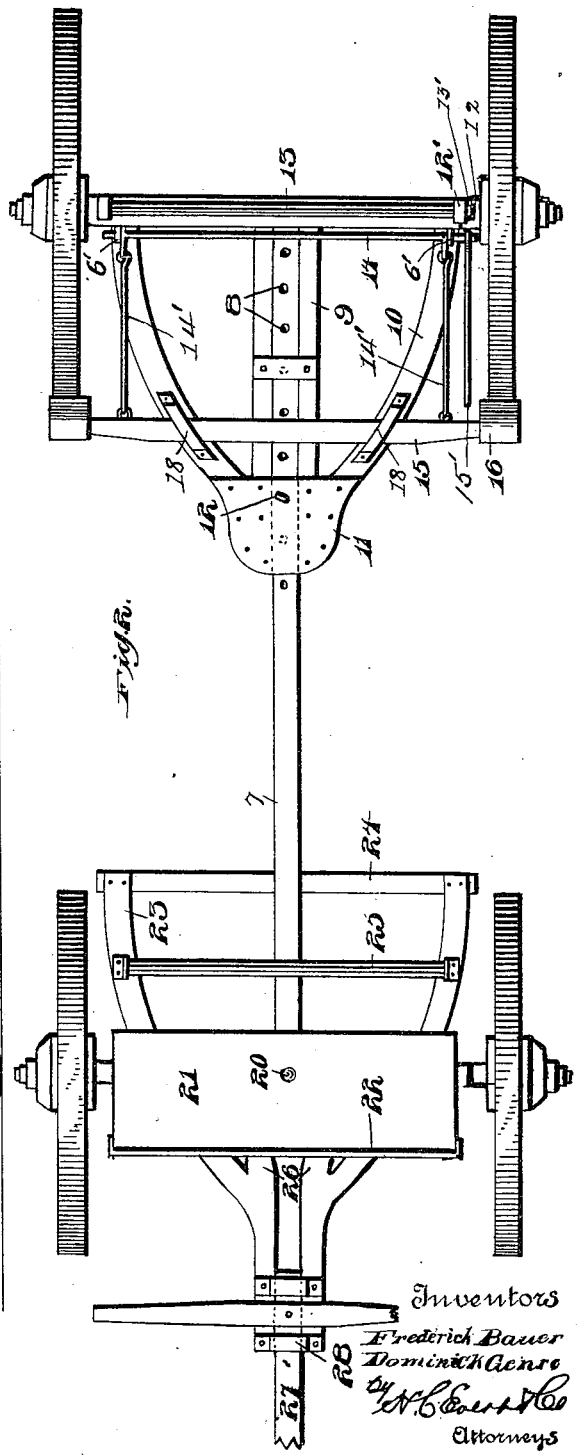
Witnesses
Inventors
Frederick Bauer
Dominick Genre
Attorneys
THE NORRIS PETERS CO., PHOTO-LITHO., WASHINGTON, D. C.

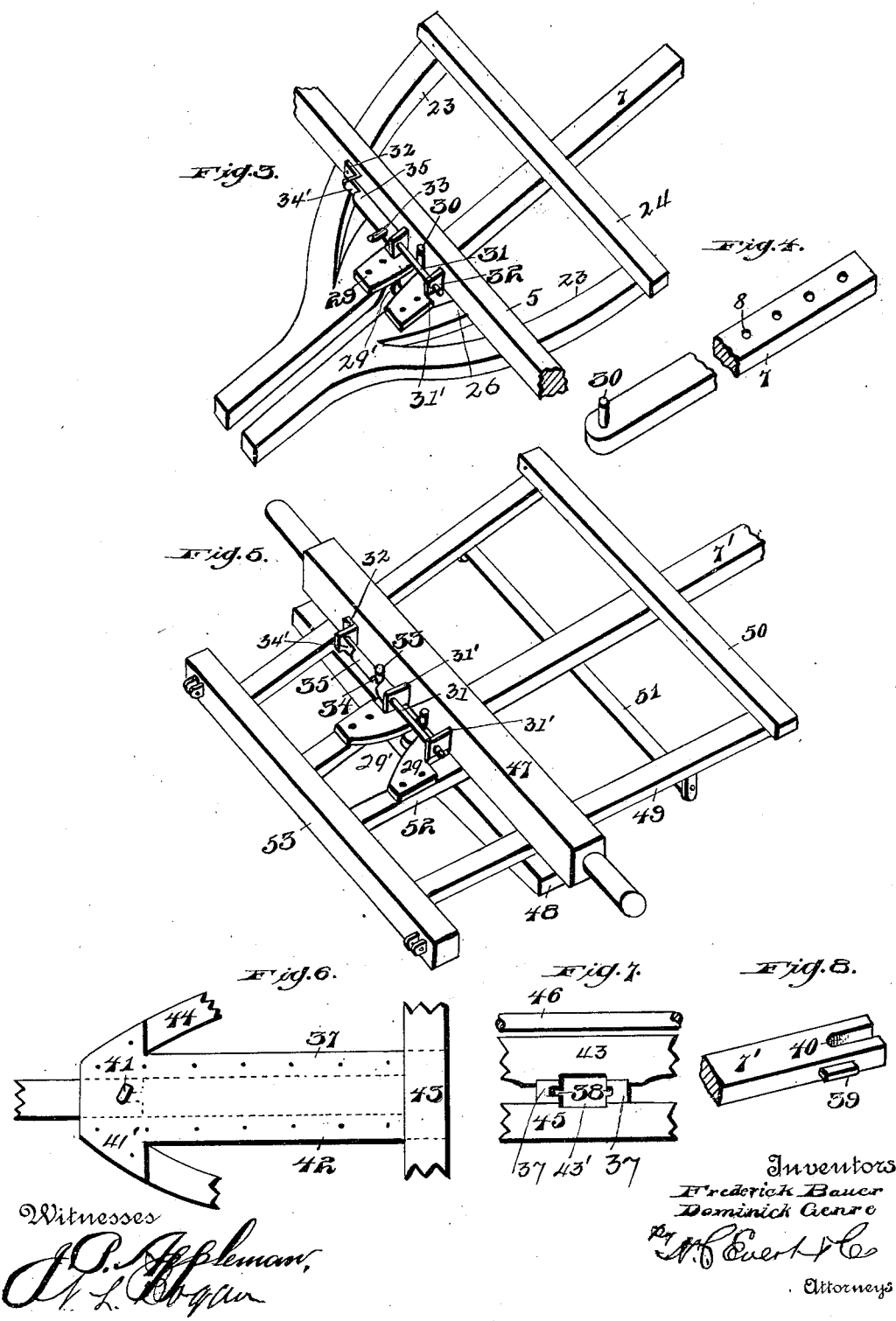

UNITED STATES PATENT OFFICE.

FREDERICK BAUER AND DOMINICK GENRE, OF WILMERDING, PENNSYLVANIA.

DUMPING-WAGON.

SPECIFICATION forming part of Letters Patent No. 658,937, dated October 2, 1900.

Application filed April 20, 1900. Serial No. 13,611. (No model.)

*To all whom it may concern:*

Be it known that we, FREDERICK BAUER and DOMINICK GENRE, citizens of the United States of America, residing at Wilmerding, in the county of Allegheny and State of Pennsylvania, have invented certain new and useful Improvements in Dumping-Wagons, of which the following is a specification, reference being had therein to the accompanying drawings.

This invention relates to certain new and useful improvements in self-dumping wagons, and is particularly adapted for the hauling and unloading of lumber.

The invention aims to construct a self-dumping wagon for carrying lumber with means whereby an entire load carried by the wagon may be dumped at once.

With this object in view our invention consists of a lumber-wagon, comprising front and rear wheels, axles, and bolsters, and a coupling-pole adjustably secured to the hound of the rear bolster and slidably secured to the front bolster, whereby when the rear wheels are chocked or braked the load will be tilted on the rear bolster as a pivot by backing the team.

Our invention further consists of a lumber-wagon provided with the usual front and rear wheels, axles, and bolsters, a coupling-pole adjustably secured to the rear bolster and slidably secured to the front bolster, means to prevent the movement of the coupling-pole through the front bolster, an antifriction-roller carried by the hounds of the front bolster, and a friction-roller journaled in the rear bolster, whereby by chocking or braking the rear wheels and backing the team the load of lumber may be tilted on the rear bolster.

With the above and other objects in view the invention consists in constructing a self-dumping wagon which shall be extremely simple in construction, strong, durable, efficient in its operation, and comparatively inexpensive to manufacture.

The invention finally consists in the novel construction, combination, and arrangement of parts to be hereinafter more fully described and specifically pointed out in the claims.

In describing the invention in detail reference is had to the accompanying drawings, forming a part of this specification, and wherein like numerals of reference indicate corresponding parts throughout the several views, in which—

Figure 1 is a side elevation of our improved dumping-wagon, showing the same in full lines in the extended position and showing the front wheels in dotted lines in the backed position to dump the load. Fig. 2 is a top plan view of the wagon in the extended position. Fig. 3 is an inverted perspective view of the front hounds, showing the axle broken away. Fig. 4 is an inverted perspective view of the coupling-pole, partly broken away. Fig. 5 is an inverted perspective view of a modified form of front bolster as used in connection with a one-horse wagon. Fig. 6 is a top plan view of a part of the rear bolster and hounds for the modified form of construction, showing the coupling-pole secured in position. Fig. 7 is a front elevation of the same with the coupling-pole removed. Fig. 8 is a perspective view of a part of the form of coupling-pole employed in this modified form of construction.

Referring to the drawings by reference-numerals, 1 represents the front wheels of the wagon; 2, the rear wheels thereof, which are mounted on their respective axles 3 and 4, the usual bolsters 5 and 6 being mounted upon the front and rear axles. The coupling-pole 7 is provided with a series of openings 8 to permit of the adjusting of the coupling so as to give the desired length of wagon. The rear hounds 10 are secured in the bolster 6 at their rear ends and at their forward ends in a sleeve 11, and also secured in this rear bolster and in the sleeve 11 is a pair of side rails 9, which are adapted to receive the coupling-pole between them. The sleeve 11 is provided with an opening to receive the coupling-pin 12 to fasten the coupling-pole at its rear end. The bolster 6 carries the usual standards 12', in which is journaled directly above the bolster 6 a roller 13, the shaft of which has mounted on one end thereof a ratchet-wheel, which is engaged by the pawl 13', carried by the standard, and the roller thus held against rotation until the pawl is released from engagement with its at their rear ends between the rear axle 45 and the rear bolster 43, an opening 43' is formed to permit the rearward movement of the coupling-pole 7' when the coupling-pin 41 is removed, the forward movement of the rear end of this pole being arrested by the engagement of the lugs 29 with the sleeve 41. In this construction the roller 46 is mounted in the rear standards (not shown) in the same manner as described for the two-horse wagon. The front axle 47 has mounted between the same and its bolster 48 the front hounds 49, connected together at their rear ends by a cross-bar 50 and at their front ends secured to a hitch-bar 53. Connected at their front ends to this hitch-bar is a pair of guide-bars or side rails 52, the rear ends of which are secured between the front axle 47 and bolster 48. The slide-bolt 31 in this construction, as well as the various parts in connection therewith, have been shown as identical in construction with that heretofore described, and the same reference-numerals have been applied thereto, though when used in this construction the slide-bolt acts principally to prevent the forward movement of the coupling-pole, since to unload the lumber in this construction the coupling-pin 41 is removed, and as the front truck is backed the engagement of the pin 30 with the slide-bolt causes the coupling-pole to slide rearwardly through the opening 43', the load tilting when the center of weight passes beyond the roller 46, as heretofore described. A suitable antifriction-roller 51 is connected to the front hounds 49 in this construction for the pole 7' to engage, though this roller may be dispensed with in this construction, if desired.

Having thus fully described our invention, what we claim as new, and desire to secure by Letters Patent, is—

1. The combination in a lumber-wagon, of the front and rear trucks, the front and the rear hounds secured in their respective trucks, the roller mounted in the standards of the rear bolster, the bed-plate mounted on the bolster of the front truck and carrying a cage, and the coupling-pole adapted to engage in the front and rear hounds, said coupling-pole being adapted to be rigidly secured in the rear hounds and adapted to slide forwardly between the front hounds as the front truck is moved backward, substantially as described.

2. The combination in a lumber-wagon, of the front and rear trucks, the front and rear hounds secured in their respective trucks, the roller mounted in the standards of the rear bolster, the bed-plate mounted on the bolster of the front truck, the coupling-pole adapted to engage in the front and rear hounds, said coupling-pole being adapted to be rigidly secured in the rear hounds and adapted to slide forwardly between the front hounds as the front truck is moved backward, and means for locking said pole against forward movement when the trucks are in the extended position, substantially as described.

3. In a lumber-wagon, the combination with the rear truck carrying brake mechanism, the roller journaled in the standards of the rear truck, means securing said roller against rotation, the hounds secured in said rear truck, the front truck, the hounds carried thereby, and the bed-plate mounted on said front truck, of the coupling-pole adapted to be rigidly secured to the hounds of the rear truck and to slide forwardly between the hounds of the front truck as the latter is moved backward, and a pin carried by said pole near its forward end for engagement with the bolster of the front truck, as and for the purpose described.

4. In a lumber-wagon, the combination with the front and rear trucks, and the hounds carried thereby, of a coupling-pole provided near its forward end with a pin to engage with the bolster of the front truck, means for securing the rear end of said pole to the rear hounds, and a slide-bolt carried by the front truck for engagement with the pin carried by the pole to limit the forward movement of said pole, substantially as described.

In testimony whereof we affix our signatures in the presence of two witnesses.

FREDERICK BAUER.
    DOMINICK GENRE.

Witnesses:
 JOHN NOLAND,
 N. L. BOGAN.